(12) United States Patent
Shimizu (10) Patent No.: US 8,536,828 B2
(45) Date of Patent: Sep. 17, 2013

(54) COORDINATING CONTACTLESS COMMUNICATION AND CHARGING FUNCTIONS

(75) Inventor: Kanjiro Shimizu, Tokyo (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 399 days.

(21) Appl. No.: 12/900,177

(22) Filed: Oct. 7, 2010

(65) Prior Publication Data

US 2011/0215756 A1    Sep. 8, 2011

Related U.S. Application Data

(60) Provisional application No. 61/309,653, filed on Mar. 2, 2010.

(51) Int. Cl.
*H02J 7/00* (2006.01)
(52) U.S. Cl.
USPC .......................................................... 320/108

(58) Field of Classification Search
USPC .......................................................... 320/108
See application file for complete search history.

(56) References Cited

U.S. PATENT DOCUMENTS
2007/0032274 A1*  2/2007  Lee et al. ................... 455/575.2

FOREIGN PATENT DOCUMENTS
JP    2001307032 A  * 11/2001
JP    2007-249305 A5    9/2007

* cited by examiner

*Primary Examiner* — Samuel Berhanu
(74) *Attorney, Agent, or Firm* — Oblon, Spivak, McClelland, Maier & Neustadt, L.L.P.

(57) ABSTRACT

An electronic device includes a contactless integrated circuit card function unit, a contactless charging function unit, and a switching unit. The contactless integrated circuit card function unit includes a clamp circuit and realizes a contactless integrated circuit card function. The clamp circuit suppresses excessive voltage of a signal received at an antenna whose operating frequency is a predetermined frequency. The contactless charging function unit commonly uses the antenna and realizes a contactless charging function. The switching unit invalidates or reduces the function of the clamp circuit when the contactless charging function unit is used.

18 Claims, 8 Drawing Sheets

COORDINATING CONTACTLESS COMMUNICATION AND CHARGING FUNCTIONS

CROSS REFERENCE TO RELATED APPLICATION

This application claims the benefit of priority of Provisional Application Ser. No. 61/309,653, filed Mar. 2, 2010, the entire contents of which is incorporated herein by reference.

BACKGROUND OF THE INVENTION

1. Field of the Invention

The present invention relates to techniques for efficiently sharing necessary hardware when both contactless integrated circuit (IC) card technology and wireless charging technology are included in an electronic device.

2. Description of the Related Art

Electronic devices represented by recent cellular phone terminals have a contactless IC card function such as a function called the "NFC/FeliCa" function, and these electronic devices have become more and more popular in various applications such as commuter passes, electronic tickets, and electronic money. "NFC" stands for Near Field Communication and is a short-distance wireless communication standard for performing bidirectional data communication at a very short distance of about 10 cm by using radio waves at 13.56 MHz. "FeliCa", which is a registered trademark of Sony Corporation, is the name of contactless IC card technology developed by Sony Corporation and is employed in NFC.

At the same time, wireless charging technology for charging cellular phone terminals without using cables has recently been proposed. Japanese Unexamined Patent Application Publication No. 2007-249305 discloses techniques for contactlessly charging an electronic device from a charging apparatus by using electromagnetic coupling.

SUMMARY OF THE INVENTION

It has been proved that the following problems occur when both the wireless charging technology and the contactless IC card technology as described above are to be included in an electronic device.

That is, realization of the contactless IC card function involves a loop antenna for wireless communication, a radio-frequency (RF) block for rectification and waveform shaping, and a baseband block that converts an analog signal into a digital signal (and vice versa) and processes these signals.

Also, realization of the wireless charging technology generally involves a loop antenna and a charging block that has the mechanism capable of accumulating power induced in the antenna and efficiently feeding the power to a battery. Hardware serving as the core of the wireless charging technology has a structure similar to that of the contactless IC card technology.

It is expected in the future that various problems will occur when the wireless charging function is to be included in a cellular phone terminal with the contactless IC card function.

The first problem is the availability of space for mounting an antenna (loop antenna for wireless charging). Since multiple antennas and various devices for realizing various functions have already been present in the cellular phone terminal, there is not much space remaining. It is thus very difficult to mount an additional large loop antenna.

The second problem is the interference between the wireless charging function and the contactless IC card function which uses an operating frequency similar to that used by the wireless charging function. The contactless IC card technology is originally a communication system that employs a radio frequency band of 13.56 MHz. Communication between a reader and a card/tag is realized by causing the antenna to resonate at 13.56 MHz.

At the same time, the wireless charging function employs a similar principle, and mutual effects on each other are thus inevitable. More specifically, a clamp circuit is mounted on a contactless IC card chip to prevent damage to the chip due to excessive input when a magnetic field is received from an external reader/writer.

However, because the clamp circuit automatically discards the excessive input power higher than the necessary amount, if the contactless IC card function shares the antenna with the wireless charging function, power to be supplied to a charging circuit is restricted by the clamp circuit, resulting in very low efficiency of transferring power to the charging side.

Because of these reasons, it is necessary to devise a new mechanism that allows both the functions to share the same antenna and to coexist while minimizing mutual effects upon each other.

It is desirable to provide techniques for allowing a contactless IC card antenna to be shared as an antenna for a wireless charging function without causing problems.

According to one exemplary embodiment, the specification discloses an electronic device including a contactless integrated circuit (IC) card function unit configured to be connected to an antenna element and process a signal received at the antenna; a clamp circuit included in the contactless IC card function unit, the clamp circuit configured to suppress excessive voltage of the signal received via the antenna; a contactless charging function unit configured to be connected to the antenna and a battery of the electronic device, and charge the battery by receiving an electromotive force induced at the antenna; a switching module configured to eliminate or reduce the function of the clamp circuit; and a control unit connected to the switching module and configured to determine whether the contactless IC card function unit is in use or the contactless charging function is in use and control the switching module based on the determination.

DESCRIPTION OF THE PREFERRED EMBODIMENTS

Preferred exemplary embodiments of the present invention will now be described in detail with reference to the drawings.

Figure 1:
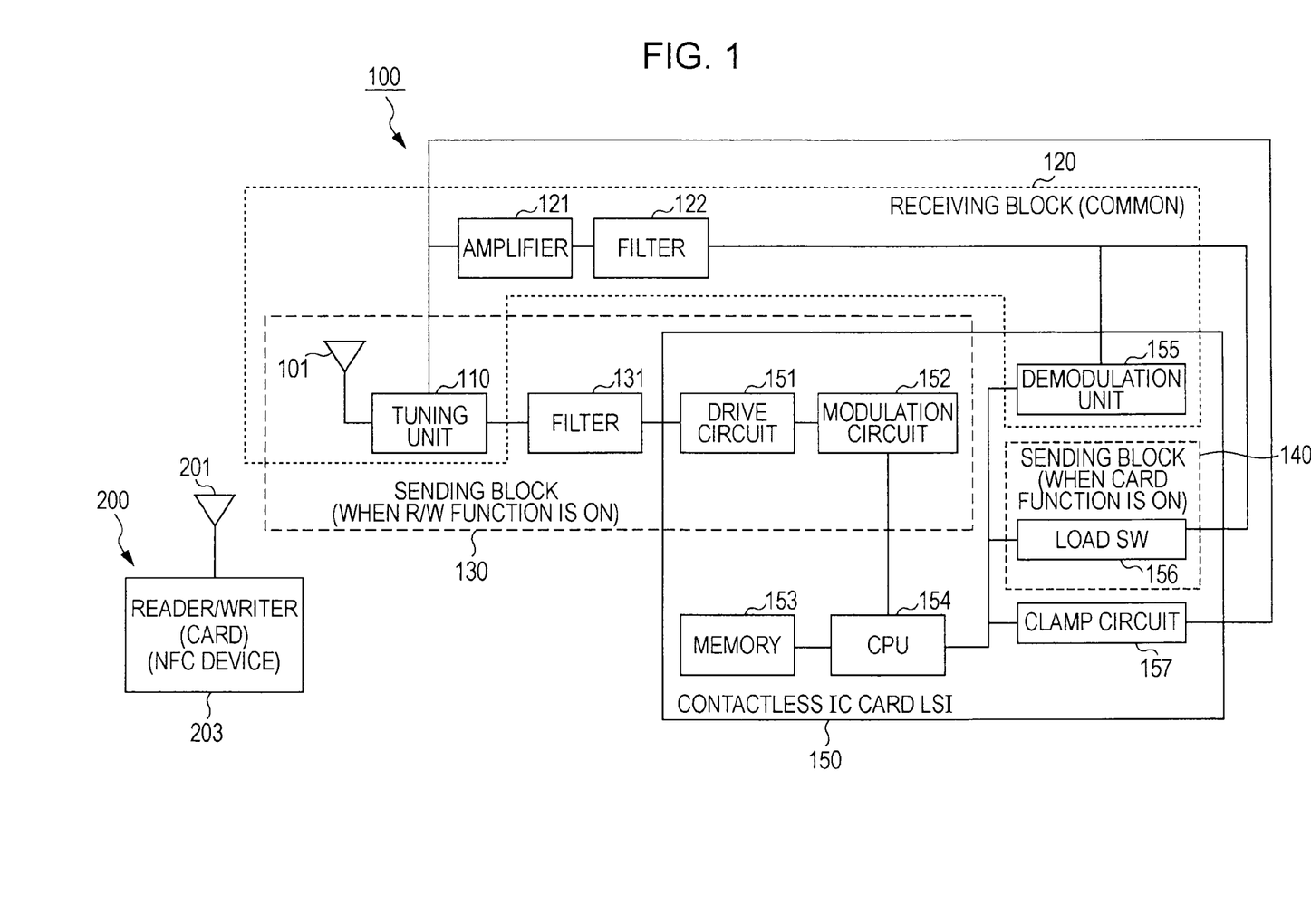
FIG. 1 is a conceptual diagram of a short-distance communication system which serves as a precondition to an embodiment of the present invention and which includes an electronic device that has two functions, i.e., a contactless IC card function and a wireless charging function, and a reader/writer.

FIG. 1 is a conceptual diagram of a short-distance communication system which serves as a precondition to an embodiment of the present invention and which includes an electronic device 100 that has two functions, i.e., a contactless IC card function and a wireless charging function, and a reader/writer 200.

The electronic device 100 includes an antenna 101, a tuning unit 110, an amplifier 121, a filter 122, a filter 131, a drive circuit 151, a modulation circuit 152, a memory 153, a central processing unit (CPU) 154, a demodulation unit 155, a load switch (SW) 156, and a clamp circuit 157.

The elements 151 to 157 are included in a contactless IC card large-scale integrated circuit (LSI) (NFC/FeliCa LSI) 150. The contactless IC card LSI 150 is a large-scale integrated circuit that includes the drive circuit 151, the modulation circuit 152, the memory 153, and the CPU 154 which realizes an upper layer of a wireless communication protocol. It is not necessary that these circuits be configured as LSI; these circuits may be built as independent elements. These elements constitute a contactless IC card function unit of an embodiment of the present invention. The other elements of a cellular phone terminal are publicly available and are thus not shown in the drawings.

A sending block 130 of a reader/writer function includes part of the elements of the contactless IC card LSI 150, the filter 131, the tuning unit 110, and the antenna 101.

Figure 2A:
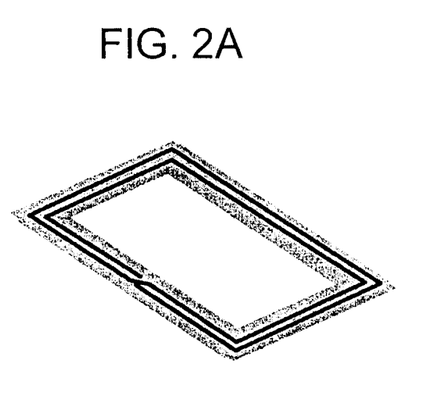
FIGS. 2A and 2B are illustrations of antenna types.
Figure 2B:
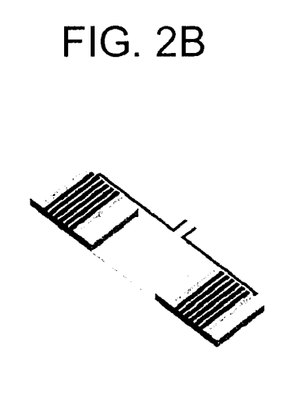

The antenna 101 is a single element for both sending and receiving signals. As illustrated in FIGS. 2A and 2B, the antenna 101 may be a type formed by vertically winding coils around a plate-shaped ferrite (FIG. 2B) or a loop type formed by winding coils in a plane (FIG. 2A). Either type may be employed as an antenna used in an electronic device according to an embodiment of the present invention.

The tuning unit 110 is a block for obtaining a resonant frequency of 13.56 MHz together with an inductance component in an antenna unit. Generally, a capacitor is connected in parallel with a loop antenna of the antenna unit.

A receiving block 120 shared between a reader/writer and a contactless IC card of the electronic device 100 includes part of the elements of the contactless IC card LSI 150, the tuning unit 110, and the antenna 101. This part of the contactless IC card LSI 150 is an LSI including the amplifier 121 for amplifying response data that is from a card and that has been amplitude-shift-keying (ASK) modulated, the filter 122 for shaping the waveform, and the demodulation unit 155 for extracting data. This LSI also serves as a circuit that extracts a clock frequency of a carrier received from the external reader/writer 200.

When a response is to be sent to the reader/writer 200 side at the time at which the card function is ON, the response is modulated by repeatedly turning ON and OFF the load using the load SW 156 to change a load resistance of the antenna 101. The modulated waveform seems to be an impedance change at the tip of an antenna 201 of the reader/writer 200 side and is transmitted as an amplitude difference of voltage and current. The amplitude difference is converted into digital data and is processed.

To prevent damage to the chip due to excessive input when a magnetic field is received from the external reader/writer 200, the clamp circuit 157 has a function of suppressing a voltage greater than or equal to a certain amount in order to suppress excessive voltage of the received signal.

When the electronic device 100 functions as a reader/writer, the element 200 represents a contactless IC card or an NFC device.

Figure 3A:
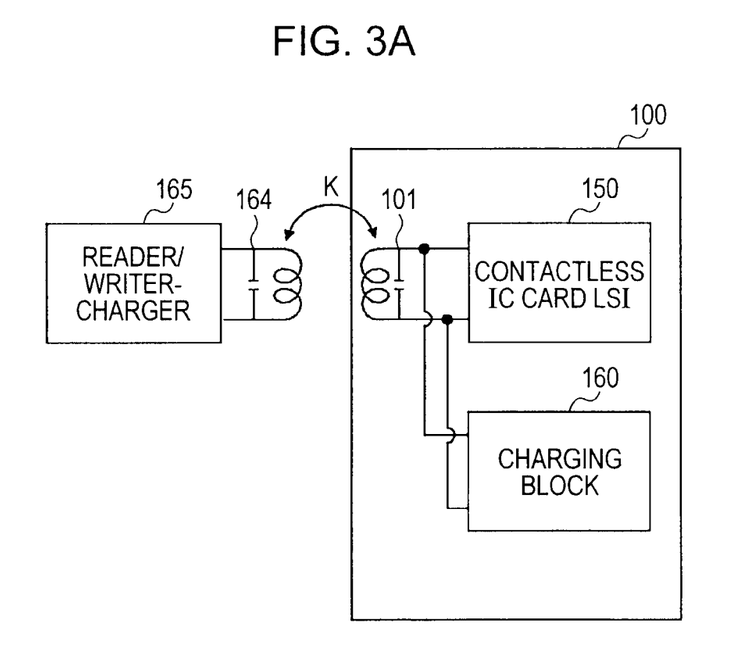
FIG. 3A is a diagram illustrating a structure example of an electronic device according to an embodiment of the present invention.
Figure 3B:
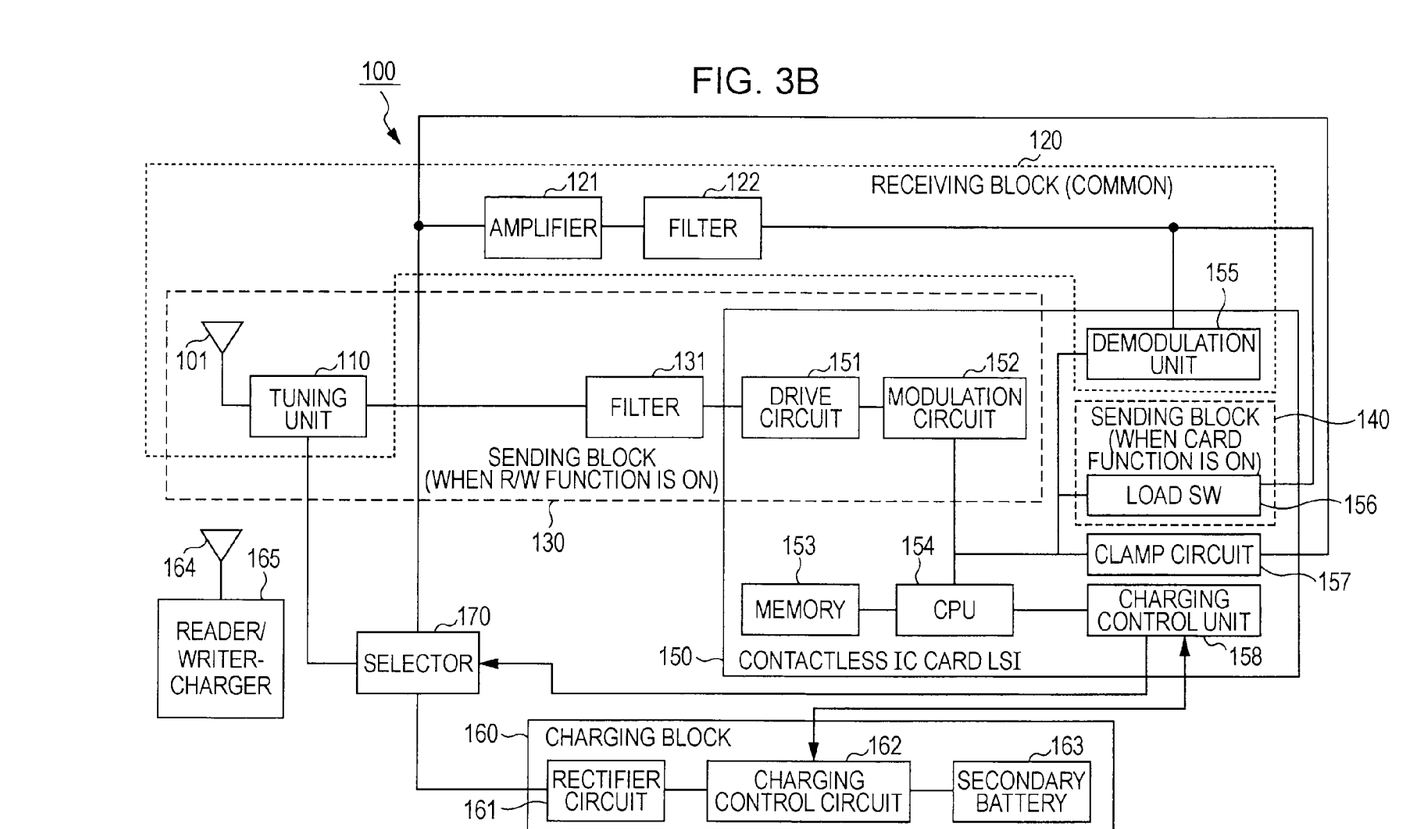
FIG. 3B is a diagram illustrating a specific example of the structure of the electronic device illustrated in FIG. 3A.

FIG. 3A is a diagram illustrating the relationship between the electronic device 100 according to the embodiment and a reader/writer-charger 165 with an external charger function. The basic principle of charging in this example is power transfer using electromagnetic induction. That is, two coil antennas that face each other are provided between the charging side (the reader/writer-charger 165 in the example illustrated in FIG. 3A) and the side to be charged (the electronic device 100), and alternating current (AC) is caused to flow through the coil (an antenna 164) at the power sending side. Accordingly, a magnetic flux change occurs in the coil (antenna 164) at the power sending side, and an electromotive force occurs in the other coil (the antenna 101), resulting in the flow of current. That is, energy is transmitted contactlessly through a magnetic flux change. The power excited at the antenna 101 is smoothed by a rectifier circuit 161, controlled by a charging control circuit 162 to be an appropriate amount of voltage and current, and is supplied to a secondary battery 163 (the elements 161 to 163 are shown in FIG. 3B). The secondary battery 163 is charged with voltage and current from the charging control circuit 162.

FIG. 3B illustrates a structure example of the electronic device 100 according to the embodiment. The same reference numerals are given to elements that are the same as or similar to those illustrated in FIG. 1, and overlapping descriptions thereof are omitted. In this structure, a charging block 160 for wireless charging (contactless charging function unit), a selector 170 that selects a transfer path from the antenna 101, and a charging control unit 158 that appropriately controls the selector 170 in accordance with a communication partner are added to the system illustrated in FIG. 1. The charging control unit 158 and the selector 170 constitute a unit that removes effects of the contactless IC card function unit when power is charged contactlessly.

The charging block 160 includes the rectifier circuit 161, the charging control circuit 162, and the secondary battery 163.

Next, the operation of the embodiment will be described.

Figure 4:
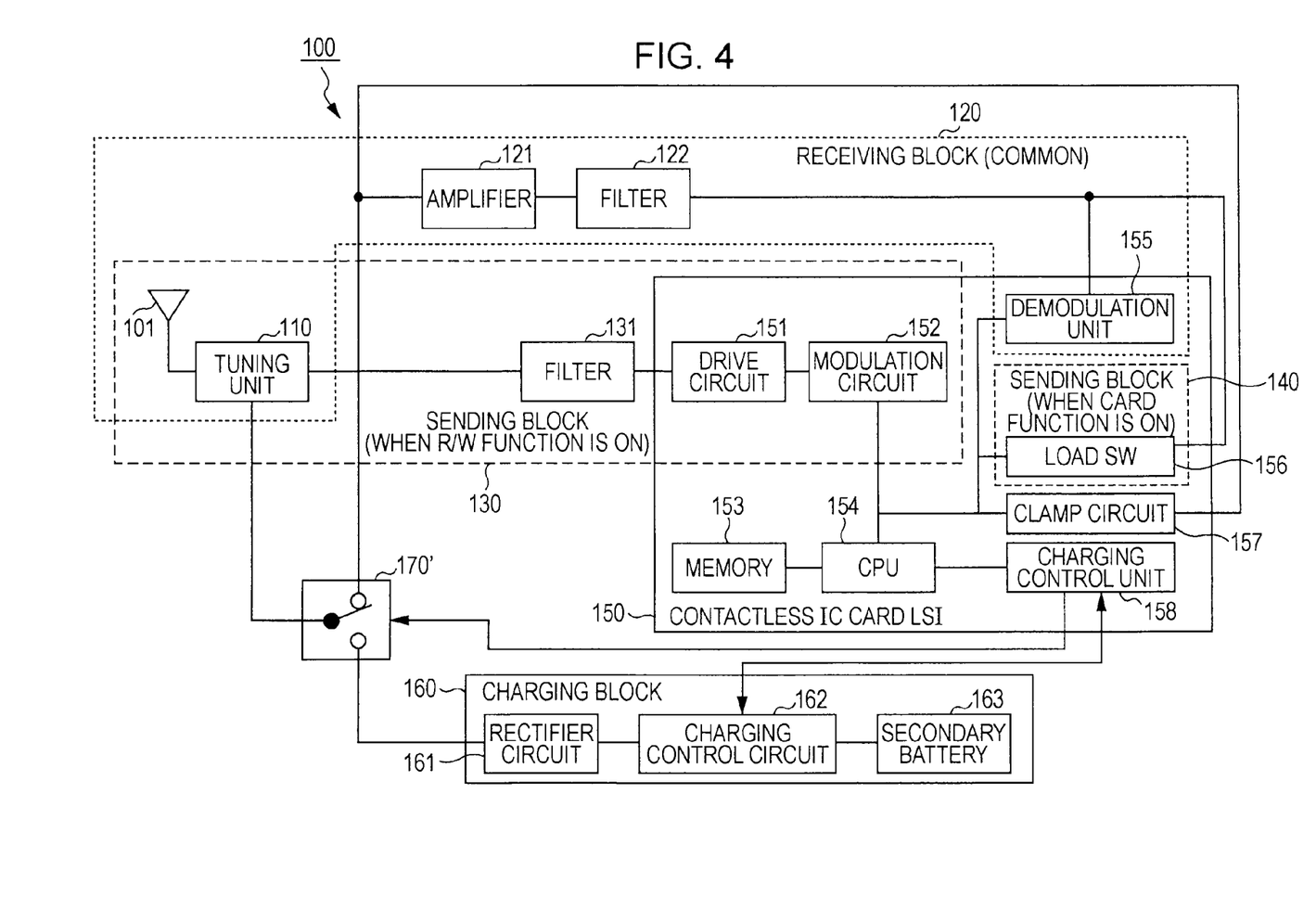
FIG. 4 is a diagram illustrating a structure example in which a selector illustrated in FIG. 3B is replaced by a switch.

FIG. 4 illustrates the electronic device 100 in which the selector 170 illustrated in FIG. 3B is replaced by a switch 170'. Normally, the antenna 101 and the tuning unit 110 are connected to the contactless IC card LSI 150 side. In this example, the section that is in charge of turning the switch 170' is the contactless IC card LSI 150. The entire control is performed by the contactless IC card LSI 150 serving as a master. That is, the antenna 101 and the tuning unit 110 are connected to the charging block 160 only when it is determined that there is a necessity to start charging upon a request from an external charger (reader/writer-charger 165 illustrated in FIG. 3) to start charging. This entire processing is controlled by the contactless IC card LSI 150. The charging control unit 158 controls the charging control circuit 162 and the switch 170' on the basis of a processing result obtained by the CPU 154.

Figure 5:
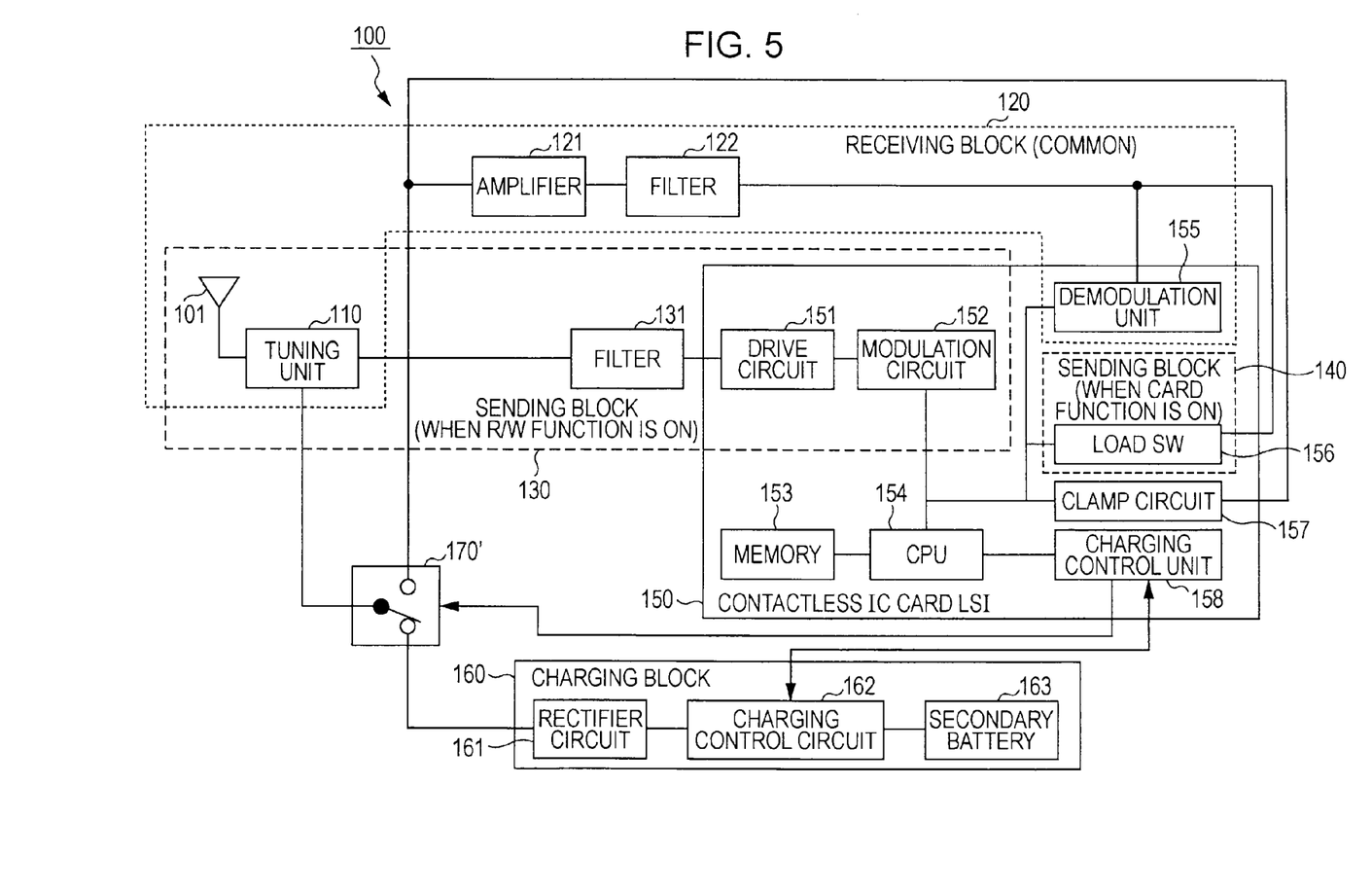
FIG. 5 is a diagram illustrating an example in which an antenna and a tuning unit are connected to a charging block side in the structure illustrated in FIG. 4.

FIG. 5 illustrates an example in which the antenna 101 and the tuning unit 110 are connected to the charging block 160 side due to the turning of the switch 170'. The remaining elements are the same as those illustrated in FIG. 4.

Next, an algorithm from a charging start request to the actual start of charging will be briefly described.

Normally, wireless communication using NFC is started by a polling command from a reader/writer (R/W) side. Though the actual command to be used varies according to the RF standard to be used, the basic flow is the same. The embodiment of the present invention assumes that the charger side complies with an NFC wireless protocol, and the protocol is the extension of the current specifications. It is also assumed that a determination bit representing the presence/absence of a charger function is included in information in a frame.

Figure 6:
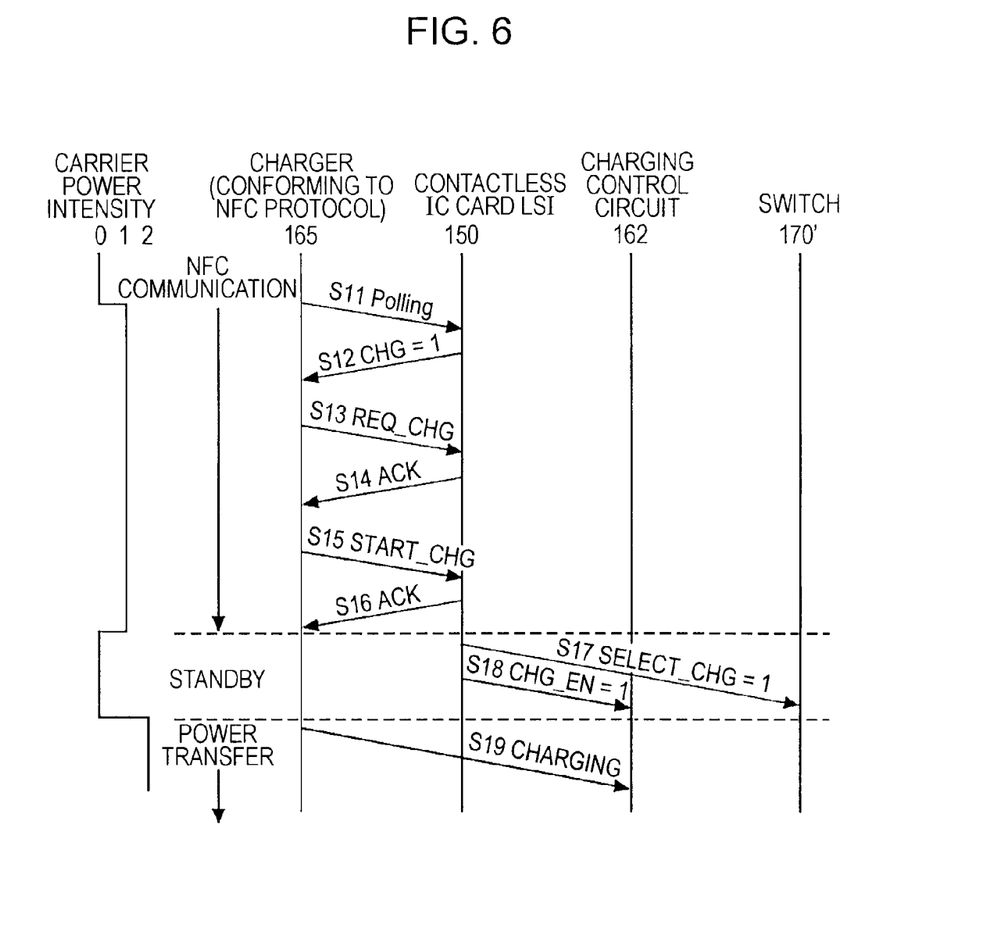
FIG. 6 is a sequence diagram illustrating exchange of signals between a contactless charger and the units of the electronic device according to the embodiment of the present invention.

FIG. 6 is a sequence diagram illustrating exchange of signals between a contactless charger (reader/writer-charger 165) and the units of the electronic device 100 according to the embodiment. The state of a magnetic field (RF) generated by the coil antenna 164 at the reader/writer-charger 165 side in accordance with time is illustrated on the right of FIG. 6. It is assumed that there are three levels, i.e., 0, 1, 2, for the power intensity of the carrier where 0<1<2:

level 0: off (standby)
level 1: communication of contactless IC card function
level 2: contactless charging First, a polling command is sent wirelessly from the contactless charger 165 (S11). This corresponds to REQA of ISO 14443A or a polling command of FeliCa. In response to this polling command, when the electronic device 100 is a device conforming to the contactless charging function, a CHG bit (CHG=1 in this case) in a frame is set, and a response is sent (S12). As a precondition, a specific bit in a frame of the polling command is defined as a CHG bit. In this example, it is assumed that the charger 165 side has been able to check whether the partner device (electronic device 100) is a device that conforms to the contactless charging function. Next, the charger 165 sends a request command REQ_CHG for starting charging to the contactless IC card LSI 150 (S13). The contactless IC card LSI 150 has been storing, in the internal memory 153, an ON/OFF default value indicating whether to use the contactless charging function. In accordance with this information, the contactless IC card LSI 150 sends ACK/NACK (S14). When the contactless charging function is OFF, the process may be terminated after a certain time has elapsed (time out). When the electronic device 100 has the contactless charging function, the contactless charging ON/OFF default value can be set by a user to selectively validate/invalidate the function. When the electronic device 100 does not have the contactless charging function, the default value is set to OFF.

When ACK is sent from the contactless IC card LSI 150, a command START_CHG for starting charging is sent from the charger 165 side (S15). The contactless IC card LSI 150 sends ACK in response to this command (S16), and the charger 165 side prepares to transfer power. Power transfer actually starts after a certain interval (standby state illustrated in FIG. 6). During the interval, the contactless IC card LSI 150 sends a control signal SELECT_CHG=1 to the switch 170' (S17) and turns the switch 170' toward the charging block 160 side. Thereafter, the contactless IC card LSI 150 also sends a control signal CHG_EN=1 to the charging control circuit 162 and enables the charging control circuit 162 (S18). Accordingly, charging (power transfer) from the charger 165 starts (S19).

A charging ending sequence may take the following two cases.

The first case is simply that the charging control circuit 162 in the charging block 160 automatically detects that the secondary battery 163 has been fully charged and accordingly the charging control circuit 162 informs the charging control unit 158 in the contactless IC card LSI 150 that charging has been completed.

The second case is when the antenna 101 connected to the contactless IC card LSI 150 is physically separated from the antenna 164 of the charger 165 and there is no longer power transfer from the charger 165. In this case, the charging control circuit 162 detects a voltage level from the rectifier circuit 161 (RF detector) in the charging block 160 and, when this level falls below a certain threshold, informs the charging control unit 158 in the contactless IC card LSI 150 thereof. In response to this, the charging control unit 158 turns the switch 170' to default, i.e., toward the common receiving block 120 side.

According to the first embodiment described above, the switch 170' is turned toward the common receiving block 120 side in a period in which contactless charging is not performed, as illustrated in FIG. 4. Thus, the clamp circuit 157 can efficiently function in a desired manner, and the contactless IC card LSI 150 can be protected against excessive voltage. Also in this state, the charging block 160 is completely separated from the transfer path from the antenna 101. Thus, there is no effect on the receiving block 120 side. The switch 170' is turned toward the charging block 160 side in a period in which contactless charging is performed, as illustrated in FIG. 5. Thus, the clamp circuit 157 is completely separated from the transfer path from the antenna 101, resulting in prevention of deterioration of the charging efficiency of the charging block 160 due to the clamp circuit 157.

Figure 7:
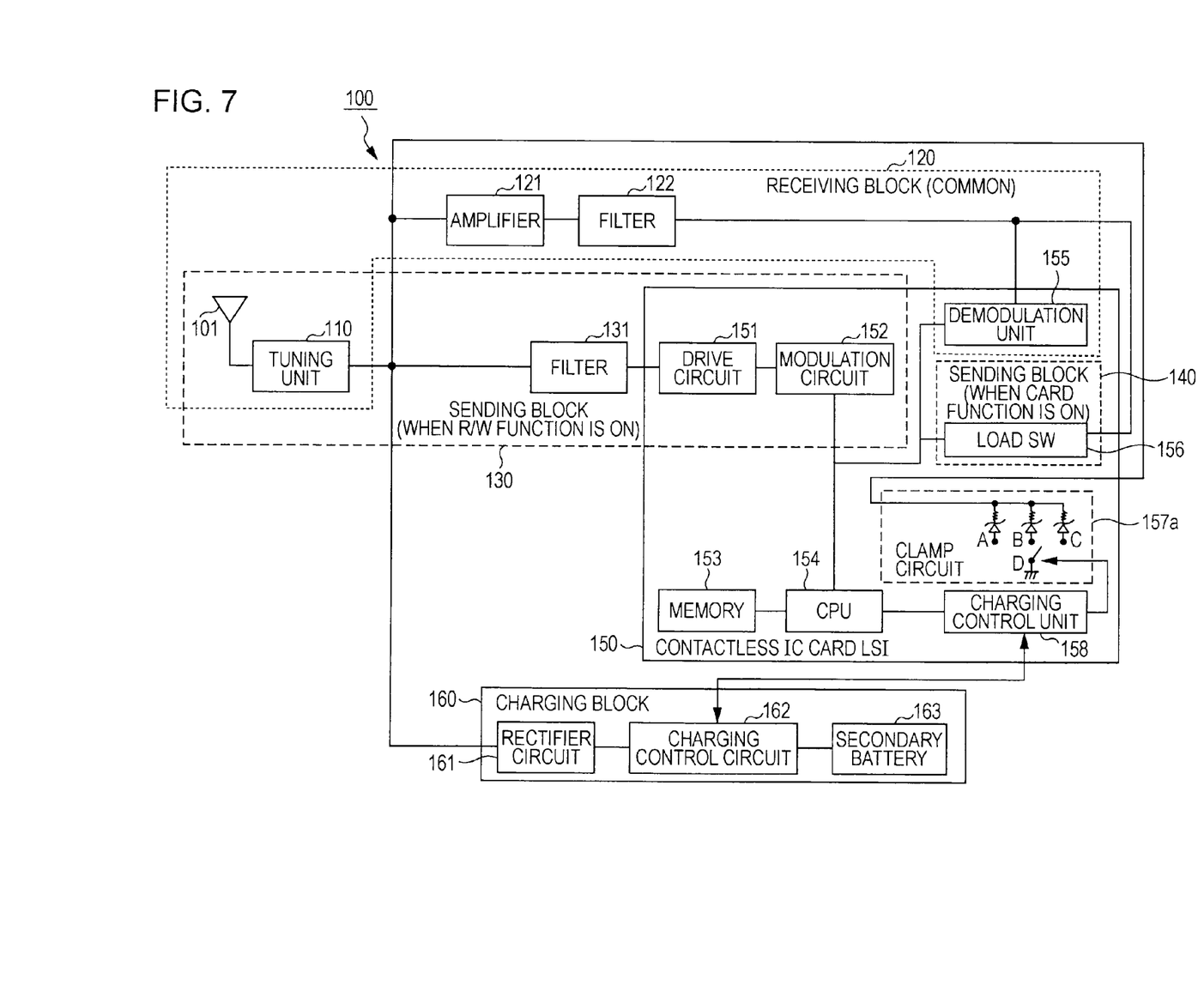
FIG. 7 is a diagram illustrating a structure example of the electronic device according to a second embodiment of the present invention.

FIG. 7 illustrates a structure example of the electronic device 100 according to a second embodiment of the present invention. The same reference numerals are given to elements that are the same as or similar to those illustrated in the above-described other drawings, and overlapping descriptions thereof are omitted. This embodiment relates to a method in which a unit (selector 170) that selects the transfer path of the circuit is not used. Specifically, a clamp circuit 157a that can perform control to switch the level of voltage to suppress (clamp voltage) or to be selectively invalidated is provided as the clamp circuit 157 included in the contactless IC card LSI 150. That is, in this embodiment, the charging control unit 158 and the clamp circuit 157a constitute a unit that removes effects of the contactless IC card function unit when power is charged contactlessly. The clamp circuit 157a includes three pairs (A, B, and C) of a resistor and a constant-voltage element (Zener diode in FIG. 7) and a switch D that grounds one of these pairs. The number of pairs is not limited to three. The voltage values (clamp voltages) of the constant-voltage elements of the individual pairs are set to different levels. It is assumed that at least one of the voltage values of the constant-voltage elements of the three pairs is higher than a voltage value when the contactless IC card function is used. When charging is performed, such a constant-voltage element is selected. When there is only one pair, a constant-voltage element with a normal voltage value is used, and selective invalidation operation of the clamp circuit 157a is performed using the switch D.

More specifically, it is assumed that the relationship among thresholds of a voltage level (clamp voltages of the individual pairs) Vth at which the clamp circuit 157a operates is A>B>C. In this case, Vth is set to B or C when, for example, communication using NFC is performed. When charging is performed (that is, when the contactless charging function unit is used), the clamp circuit 157a is switched to A, thereby restricting the function of the clamp circuit 157a. That is, the threshold of the voltage level at which the clamp circuit 157a operates is increased. Accordingly, useless consumption of power at the contactless IC card LSI 150 side can be prevented as much as possible during charging.

Charging can be most efficiently performed when the threshold of the clamp circuit 157a is set to none of A to C, and the clamp circuit 157a is invalidated (OFF). This method is effective when the charging block 160 side has entered a state in which power supplied from the contactless charger 165 can be certainly consumed and no excessive voltage is applied to the contactless IC card LSI 150 side.

Figure 8:
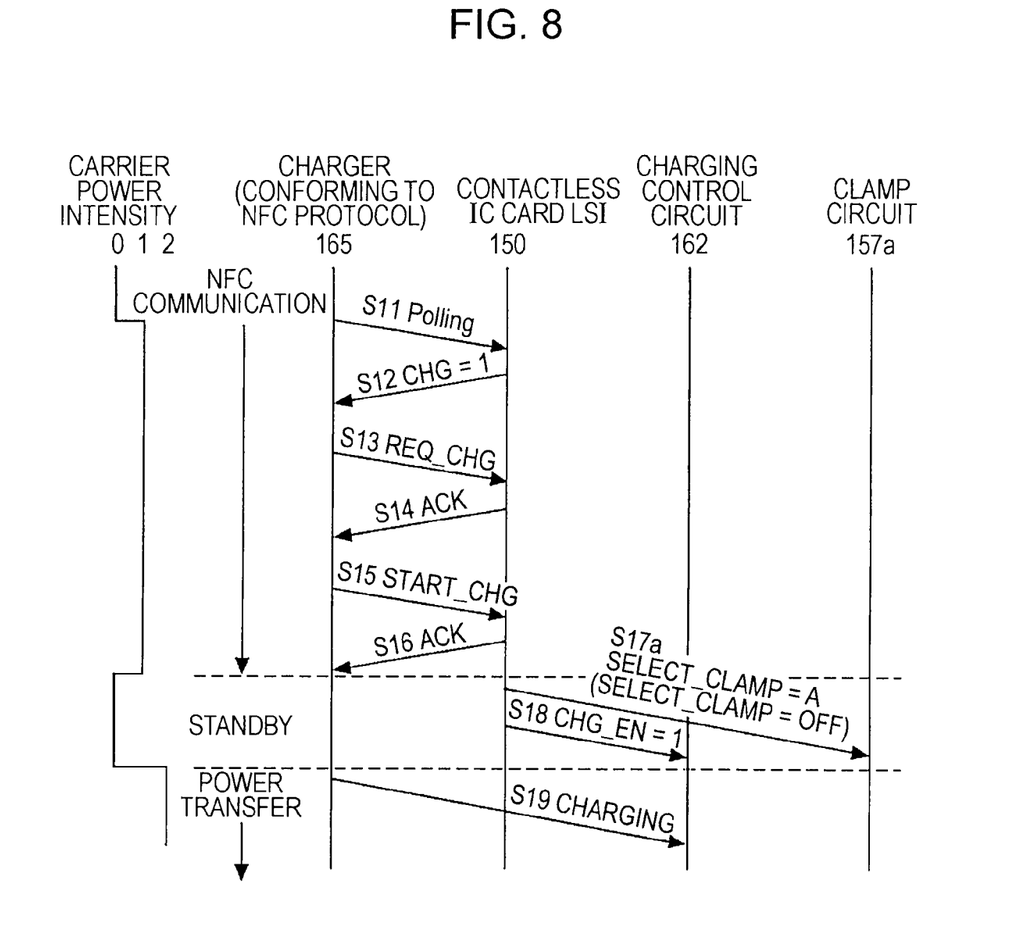
FIG. 8 is a sequence diagram illustrating exchange of signals between the contactless charger and the units of the electronic device according to the second embodiment of the present invention.

FIG. 8 is a sequence diagram illustrating exchange of signals between the contactless charger (reader/writer-charger 165) and the units of the electronic device 100 according to the second embodiment. The same reference numerals are given to elements that are the same as or similar to those illustrated in FIG. 6, and overlapping descriptions thereof are omitted. In the sequence diagram of FIG. 8, steps S11 to S16 are the same as those illustrated in FIG. 6. Thereafter in the standby state, instead of an instruction to turn the switch 170' in step S17 in FIG. 6, an instruction to switch the clamp circuit 157a is given in step S17a in the sequence diagram of FIG. 8. In the example described above, the clamp circuit 157a is switched to A or invalidated using the switch D.

With the structure illustrated in FIG. 7, an electromotive force discarded by the contactless IC card LSI 150 when charging is performed can be minimized. That is, the antenna 101 and the tuning unit 110 can be shared between the two functions. Since the selector 170 is not used in this embodiment, an output of the tuning unit 110 remains connected to the clamp circuit 157a when charging is performed. Since power excited at the tip of the antenna 101 is consumed at the charging block 160, protection of the contactless IC card LSI 150 does not become insufficient even when the clamp circuit 157a is invalidated or the threshold of the voltage level at which the clamp circuit 157a operates is increased.

Although the preferred exemplary embodiments of the present invention have been described above, various modifications or changes other than those described above can be made. For example, although the cellular phone terminal has been described as the electronic device, the electronic device is not limited to the cellular phone terminal. The embodiments of the present invention are applicable to any electronic device such as a digital camera, a camcorder, a game machine, a portable player, or a headset.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
an antenna element;
a contactless integrated circuit (IC) card function unit configured to be connected to the antenna element and process a signal received at the antenna;
a clamp circuit included in the contactless IC card function unit, the clamp circuit configured to suppress excessive voltage of the signal received at the antenna;
a contactless charging function unit including a battery and configured to be connected to the antenna, and charge the battery by receiving an electromotive force induced at the antenna;
a switching module configured to eliminate or reduce the function of the clamp circuit; and
a control unit connected to the switching module and configured to determine whether the contactless IC card function unit is in use or the contactless charging function unit is in use and control the switching module based on the determination, wherein
the switching module is a switch included in the clamp circuit configured to switch the clamp circuit between at least a first threshold voltage level and a second threshold voltage level, wherein the first threshold voltage level is lower than the second threshold voltage level.

2. The electronic device according to claim 1, wherein the switch is connected between the antenna and each of the contactless IC card function unit and the contactless charging function unit.

3. The electronic device according to claim 2, wherein the control unit is configured to control the switch to connect the antenna and the contactless IC card function unit when the determination is that the contactless IC card function unit is in use and disconnect the antenna and the contactless charging function unit.

4. The electronic device according to claim 2, wherein the control unit is configured to control the switch to connect the antenna and the contactless charging function unit when the determination is that the contactless charging function unit is in use and disconnect the antenna and the contactless IC card function unit.

5. The electronic device according to claim 1, wherein the control unit is configured to control the switch included in the clamp circuit to switch to the first threshold voltage level when the determination is that the contactless IC card function unit is in use.

6. The electronic device according to claim 1, wherein the control unit is configured to control the switch included in the clamp circuit to switch to the second threshold voltage level when the determination is that the contactless charging function unit is in use.

7. The electronic device according to claim 1, wherein the clamp circuit includes at least a first signal path corresponding to the first threshold voltage level and a second signal path corresponding to the second threshold voltage level.

8. The electronic device according to claim 7, wherein the control unit is configured to control the switch in the clamp circuit to connect the first signal path to ground when the determination is that the contactless IC card function unit is in use.

9. The electronic device according to claim 7, wherein the control unit is configured to control the switch in the clamp circuit to connect the second signal path to ground when the determination is that the contactless charging function unit is in use.

10. The electronic device according to claim 1, wherein the clamp circuit includes at least a first signal path including a first resistor and first constant voltage element corresponding to the first threshold voltage level and a second signal path including a second resistor and a second constant-voltage element corresponding to the second threshold voltage level.

11. The electronic device according to claim 10, wherein the control unit is configured to control the switch in the clamp circuit to connect the first signal path to ground when the determination is that the contactless IC card function unit is in use.

12. The electronic device according to claim 10, wherein the control unit is configured to control the switch in the clamp circuit to connect the second signal path to ground when the determination is that the contactless charging function unit is in use.

13. A method performed by an electronic device, the method comprising:

processing a signal received at an antenna element of the electronic device at a contactless integrated circuit (IC) card function unit;

suppressing excessive voltage of the signal received at the antenna at a clamp circuit included in the contactless IC card function unit;

charging a battery of the electronic device by receiving an electromotive force induced at the antenna at a contactless charging function unit connected to the antenna and including the battery;

switching a switching module to eliminate or reduce the function of the clamp circuit; and determining, at a control unit of the electronic device, whether the contactless IC card function unit is in use or the contactless charging function unit is in use and controlling the switching module based on the determination, wherein the switching module is a switch included in the clamp circuit configured to switch the clamp circuit between at least a first threshold voltage level and a second threshold voltage level, wherein the first threshold voltage level is lower than the second threshold voltage level.

14. The method of claim 13, further comprising:
switching the switch to connect the antenna and the contactless IC card function unit when the determination is that the contactless IC card function unit is in use and disconnecting the antenna and the contactless charging function unit.

15. The method of claim 14, further comprising:
switching the switch to connect the antenna and the contactless charging function unit when the determination is that the contactless charging function unit is in use and disconnect the antenna and the contactless IC card function unit.

16. The method of claim 13, further comprising:
controlling the switch included in the clamp circuit to switch to the first threshold voltage level when the determination is that the contactless IC card function unit is in use.

17. The method of claim 13, further comprising:
controlling the switch included in the clamp circuit to switch to the second threshold voltage level when the determination is that the contactless charging function unit is in use.

18. An electronic device comprising:
means for receiving a signal;
means for processing the received signal;
means for suppressing excessive voltage of the received signal;
means for charging a battery of the electronic device by receiving an electromotive force induced at the means for receiving a signal;
means for eliminating or reducing the function of the means for suppressing; and
means for determining whether the means for processing or means for charging is in use and controlling the means for eliminating or reducing based on the determination, wherein
the means for eliminating or reducing the function of the means for suppressing is a switch included in the means for suppressing that switches the means for suppressing between at least a first threshold voltage level and a second threshold voltage level, wherein the first threshold voltage level is lower than the second threshold voltage level.

* * * * *